July 6, 1937. A. RAPP 2,086,435
WASHER CUTTING TOOL
Filed May 12, 1936
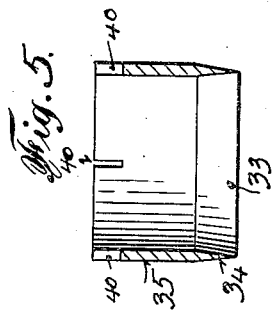
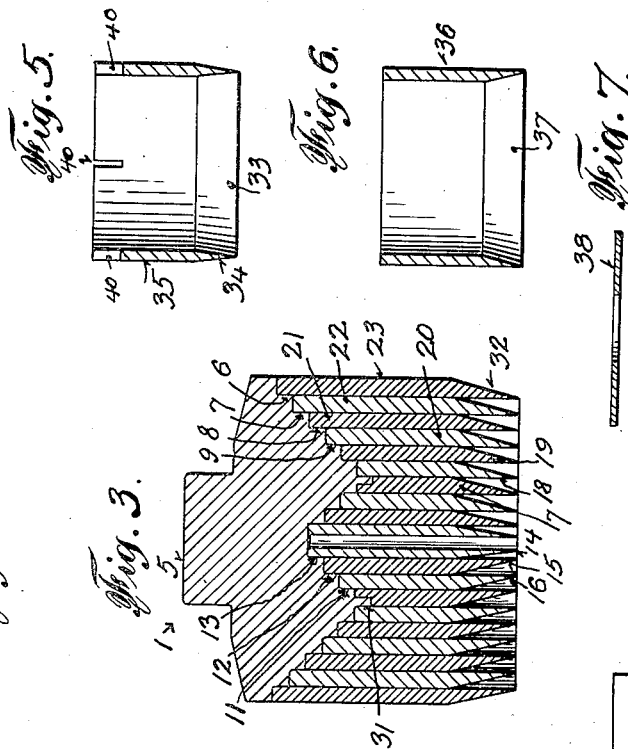
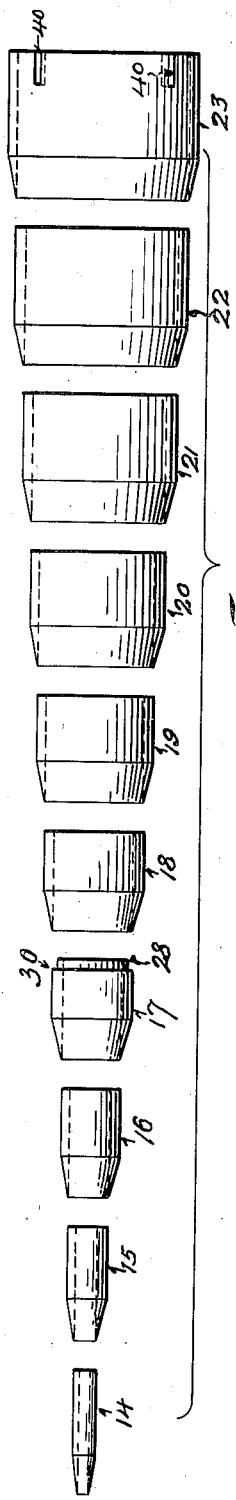
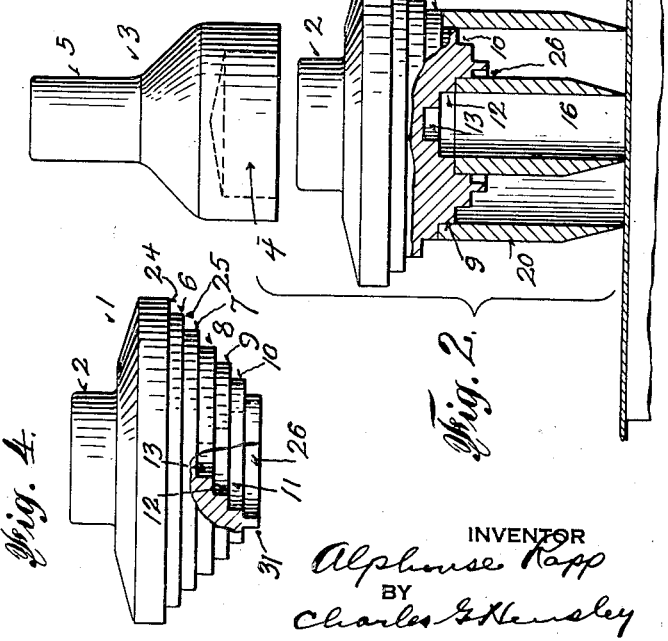
INVENTOR
Alphonse Rapp
BY
Charles G. Hensley
ATTORNEY Patented July 6, 1937

2,086,435

UNITED STATES PATENT OFFICE 2,086,435

WASHER CUTTING TOOL

Alphonse Rapp, Brooklyn, N. Y.

Application May 12, 1936, Serial No. 79,222

11 Claims. (Cl. 164—32)

In various shops, especially in garages, where it is necessary to provide washers of fibre, rubber, leather and other materials, it is necessary to carry in stock a large variety of different sized, previously cut washers or else it is necessary to cut each washer by hand, as with a knife, when required. If previously cut washers are kept in stock for long they get out of shape and they are then difficult to apply to whatever part they are to be used on or in. And, it is necessary to keep a very large variety in stock in order to have on hand washers having different inside and outside measurements. On the other hand, it is tedious to cut by hand the various washers as they are needed and it is difficult to cut them accurately. It is not convenient or economical to have on hand individual punches for cutting the washers because of the great number of punches required to meet all conditions.

The object of my invention is to provide a punch which, with a reasonable number of punching or cutting members adapted to be assembled in various combinations in the same head, may be used for punching washers having any required inside measurement and any required outside measurement up to the size of the largest cutter.

By selecting two cutters of different diameters and attaching them to the head or holder of the tool (the cutters being individually removable from and attachable to the head), a washer may be cut out at one operation, either by driving the tool by striking it a blow with a hammer or other object, or by attaching the tool to a punch press to be forced down with it, or by any other method for forcing the cutting edges of the cutters through the washer material.

As the cutters are removable from the head, any two may be used at one time for cutting a washer. For instance, I have shown cutters having cutting edges ranging from one-quarter of an inch in diameter to two and one-half inches in diameter, being stepped one-quarter of an inch from one another in diameter from the smallest to the largest. With these cutters I can arrange the tool to cut ninety different kinds of washers and by duplicating the cutters as hereinafter described, some ground outside and others ground inside and outside, it is possible to cut several hundred different sized washers.

For instance, the smallest cutter may be used in combination with any of the other cutters to provide washers having an inside diameter corresponding with the diameter of the smallest cutter and an outside diameter corresponding with any of the larger cutters in conjunction with which the smaller cutter is used.

Likewise, the second smallest cutter may be used in conjunction with any larger cutter; and in like manner any given cutter in the set may be used in conjunction with any other cutter in the set, according to inside and outside diameters of any washer desired up to the largest cutter in the set. In this way one tool head with a set of cutters may be used to cut a large variety of washers to meet any condition.

The head of the present tool has a series of stepped shoulders of various diameters, the head partaking of the general shape of a frustum of a cone. The upper or dull ends of the cutters are adapted to be slid onto the particular shoulder corresponding with the interior diameter of the cutter. The cutters may fit snugly on their respective shoulders by friction while a washer is being cut, though, if desired, any additional means may be employed for detachably holding the cutters in place on the head. These stepped shoulders form solid foundations for the several cutters and they permit the cutters to be made of slightly different diameters, say the thickness of the metal of which the cutters are preferably made. The cutters of different diameters are of different lengths so that when any particular cutter is fitted onto its particular shoulder of the head, the cutting edge of this cutter will come in the same horizontal plane with the cutting edge of any other cutter placed on its particular shoulder of the head. Thus, any two cutters used in combination for cutting a washer will cut at the same time and pierce the washer material at the same time, if the washer material is placed on a flat surface.

In order to avoid making the head unduly long and to avoid making the lower end of the head very small and therefore weak, I provide a stepped bore extending upwardly within the head from the bottom end to provide internal stepped shoulders of different diameters. Whereas the cutters which fit the external stepped shoulders have their internal surfaces engaging the stepped shoulders, the cutters which engage the internal stepped shoulders engage these with their outer surfaces; in other words, some of the cutters have an internal fit and the others an external fit.

The cutters which fit the internal stepped shoulders are of different lengths so that their cutting edges will come in the same horizontal plane with the cutting edge of any other cutter with which it is used in combination, whether the latter be an inside or outside fitting cutter.

By providing a duplicate set of cutters, differently ground, as many as over several hundred different kinds of washers may be cut with the same tool as will be described more fully hereinafter.

In the drawing forming part of this application:

Figure 1 is a group elevation of ten different cutters adapted for use in the tool illustrated, the cutters being shown on a reduced scale, Figure 2 is an elevation of the tool with a detachable striking head, parts being broken away to show the interior construction, Figure 3 is a sectional view through the middle of the head with all the cutters of a set assembled on the head as when the tool is stored away or is out of use, Figure 4 is an elevation of the head alone, with parts broken away to show the inner construction, Figure 5 is a sectional view of a cutter having its cutting end ground both inside and outside, for a purpose to be described, Figure 6 is a similar view of a cutter having the cutting edge formed by inside grinding, and Figure 7 is a sectional view of a sample washer cut by the tool when assembled, as in Figure 2.

In the drawing I have shown a head 1 of circular form, which is provided with a stud or projection 2 centrally thereof at the top, which stud may be struck directly by a hammer or other object, or a detachable striking member 3 such as is shown in Figure 2 may be employed so that the wear caused by the blow delivered by the hammer or other instrument will come directly upon the striking member. This striking member is shown as a body 3 having a bore 4 therein to receive the projection 2 on the head. It has an upwardly extending centrally located stem 5 against the top of which a hammer may be struck to drive the head when cutting a washer. As stated above, the head may be attached to a member of a stamping press or other machine for moving the head in relation to the washer material.

The lower half of the head is provided with a number of cylindrical shoulders 6—10 which are of relatively different diameters and of decreasing diameters from the uppermost one to the lowermost shoulder, the shoulders being stepped one below the other so that the head conforms generally to a frustum of a cone. Each shoulder forms a solid member for the upper or blunt end of an annular cutting member to seat upon. The several shoulders just referred to are all formed on the exterior of the head and I have shown by way of example in the drawing a head having six of these exterior shoulders, although I do not wish to limit my invention to a device having any specific number of shoulders.

If the head were formed to continue the stepped shoulders on the outside down to the smallest size, the length of the head would be too great, and the lower end of the tool would be very weak.

I therefore form a hollow bore extending upwardly from the bottom end of the head and centrally thereof, and this bore is formed with different relative diameters to provide internally stepped shoulders 11, 12, 13, the uppermost one 13 being the smallest in diameter and those below it being of relatively larger diameter to the uppermost one and to each other. I have shown three such internal stepped shoulders although there may be a greater or lesser number of these interior stepped shoulders.

In Figure 1 I have shown ten annularly shaped cutting members 14—23 each having a cutting edge at one end and with one exception having blunt or right angular edges at the end of the cutting member opposite the cutting edge and the several cutters are all adapted to telescope one within another as shown in Figure 3 because the exterior diameter of one cutter corresponds with the interior diameter of the next succeeding cutter. This allows all of the cutting members to be assembled on the head, as shown in Figure 3, so that they may be stored in compact form when not in use.

The largest cutter 23 is adapted to be frictionally fitted onto the stepped shoulder 6 with the upper end of the cutter abutting against the right angle surface 24 adjacent the stepped shoulder 6, so that the cutter may be driven downwardly by the head. The next largest cutter 22 is adapted to be fitted frictionally onto the second stepped shoulder 7 of the head with its upper end abutting against the surface 25. In like manner each of the other cutters 21—18 are adapted to be fitted onto the several stepped shoulders 8—10' of the head. The cutter 16 is adapted to be fitted into the bore of the head with its upper end fitting exteriorly against the inner surface of the stepped shoulder 13.

Likewise, the cutters 15, 14 are adapted to be fitted into the stepped shoulders 12, 11 respectively, of the head, and the upper ends of these cutters are adapted to abut against the horizontal surfaces 26 adjacent the several stepped shoulders in order that the cutters may be driven downwardly with the head.

Where the inner and outer stepped shoulders meet, I provide a shoulder 27 which is stepped but half the thickness of a cutting member, and the cutting member 17 which engages this step of the head is formed like the cutting member which is fourth from the left in Figure 1. That is to say, the upper end of this cutting member is reduced in diameter as shown at 28 and this reduced portion fits against the step 29 while the shoulder 30 abuts against the metal 31 which lies between an inner and outer step. This variation in the cutters is provided in order that there shall be a progressive step in the diameters of the cutters from the smallest to the largest as shown in Figure 3.

The cutters are so varied in their lengths in accordance with the positions of the various shoulders with which they engage, that when each cutter is mounted on its respective stepped shoulder, all of the cutting edges of the several cutters will come at the same horizontal plane as shown in Figure 3. For this reason the outermost cutting member 23 is made the longest and the next one thereto 22, is made slightly shorter, and so on, to the cutter 17. The smallest diameter cutter 14 which engages the uppermost interior stepped shoulder 13 is relatively long, whereas the cutters 15, 14 which are successively larger in diameter are made successively shorter, all as shown in Figure 3. The cutters shown in Figures 2 and 3 are all sharpened with an outside bevel 32 and when they are all sharpened in this manner they will make a cut the diameter of which corresponds with the interior diameter of the respective cutter. A group of cutters of this kind, as shown in Figure 3, may be considered as a single set.

For cutting a washer the tool may be assembled as shown in Figure 2, that is to say, one cutter 16 is mounted in the head to cut the inner diameter of the washer, and another cutter 20 is mounted on the head to cut the exterior diameter of the washer. By way of example I have shown the cutting member 16 fitted into the interior shoulder 11 and I have shown the cutter 20 fitted onto the exterior stepped shoulder 9. With the tool in this condition and with the cutting edges resting on the washer material a blow may be struck against the member 2 with a hammer, mallet or other instrument, to drive the edges of the cutters through the washer material. Or, the striking member 3 may be placed on the head and a blow may be struck on the extension 5 of the striking member for the same purpose. With the parts assembled as shown in Figure 2, a washer will be cut by the two cutting members of the dimension shown in Figure 7.

It will be apparent that any two cutting members may be mounted on the head in order to cut washers of different dimensions. Two of the cutting members which fit the outside stepped shoulders may be used for cutting washers having relatively large inner and outer diameters. Likewise, two of the cutters fitting the interior stepped shoulders may be used for cutting washers having relatively small inside and outside diameters. Furthermore, one of the cutters fitting the inside stepped shoulders may be used in conjunction with one of the cutters fitting an exterior stepped shoulder, where the washer is to have a relatively small inside diameter and a relatively large outside diameter. With the tool formed with the number of parts and proportioned as shown in Figures 2 and 3, it is possible to cut washers having inner diameters ranging from one-eighth of an inch to two inches, and with exterior diameters ranging from one-quarter of an inch to two and one-quarter inches.

It is possible to provide a second set of cutting members corresponding in diameter with the cutting members 14 to 23 inclusive, adapted to fit on the same stepped shoulders as those previously described. The second set of cutters, however, will be ground both inside and outside as shown at 33, 34 in Figure 5, and this will bring the cutting edge in a vertical plane extending through the middle of the wall of the cutter. If, for instance, a cutter 22 is placed on the head, its cutting edge will conform to the inner diameter of this cutting member so that the latter will cut a circle two inches in diameter. If, however, a cutter 35 of the same diameter as the cutter 22, but having its edge ground inside and outside as in Figure 5, is substituted for the cutter 22, then by reason of the difference in the position of the edge of this new cutter it will cut a ring which is intermediate the size of the ring cut by either of the cutters 22, 23.

By providing a second set of cutters ground inside and outside, and making them interchangeable with the first set of cutters, cuts may be made having one-half the variation in diameter that are made between the cutters of the first set alone. It would not be practical to double the number of stepped shoulders on the head to accomplish the fine distinction between sizes of cuts which can be obtained with a double set of cutters ground as described herein. In the case of the largest cutter there may be three made interchangeable instead of two. That is to say, there may be one of the larger size cutters ground on the outside as shown in Figure 3; there may be another one ground on the inside as shown in Figure 6; and these two will cut circles which differ in diameter to the extent of the thickness of the cutters. In addition, there may be a large size cutter ground both inside and outside as shown in Figure 5, and this will cut a circle which is between the sizes cut by the two first mentioned cutters.

In the case of cutters below the largest there is no advantage in having three distinct cutters for each size, but only two as the third one would be the same as the next succeeding cutter.

I prefer to provide saw cuts or kerfs 40 extending downwardly from the upper edge of each cutter, as shown in Figure 5 and in the right hand cutter in Figure 1, the cuts preferably being made at right angles to each other. This will allow a certain spring or give in the upper end of each cutter and if the exterior shoulders are formed say, one or two-thousandths over-size and the interior shoulders are made one or two-thousandths under-size, the outside fitting cutters will be slightly expansible on their upper ends to provide sufficient friction to hold these cutters on their shoulders. The inside fitting cutters would likewise be slightly compressible to create sufficient friction to hold these cutters on their shoulders.

From the above it will be apparent that I have provided a washer cutting tool of simple and strong construction and adapted to have the various size cutters placed on the head in various combinations so that washers having various inside and outside diameters ranging with the inside diameter from the smallest to the second largest cutter and with an outside diameter ranging from the size of the second smallest cutter to the largest size cutter. By providing the double set of cutters as described above, the variations in sizes of both interior and outside diameters of the washers may vary one-half the thickness of the cutters in relation to the first described set of cutters, or in other words, by providing the double set of cutters there may be finer graduations between the inside and outside diameters. The head for the various cutters is strong, solid and is designed to be employed with a large number of cutters in relation to the size of the head.

Having described my invention, what I claim is:

1. A tool for cutting washers, including a head having more than two stepped shoulders of relatively different diameters arranged in different horizontal planes and a series of more than two tubular cutting members adapted to be removably mounted on said stepped shoulders, said cutting members having annular cutting edges on their lower ends, said cutting members being of relatively different lengths so that when any two of them are mounted on their respective shoulders their cutting edges will be in the same horizontal plane.

2. A tool for cutting washers, including a head having stepped shoulders, of relatively different diameters arranged in different horizontal planes and a series of more than two tubular cutting members of annular cross section and of more than two different diameters arranged to be removably mounted on said stepped shoulders, said cutting members having annular cutting edges projecting below said head, said cutting members being of relatively different lengths according to the different positions of their stepped shoulders, whereby the cutting edges of the several cutting members when assembled on their stepped shoulders will all lie in substantially the same horizontal plane.

3. A tool for cutting washers, including a head having a striker stem projecting above the same, said head having more than two stepped shoulders of relatively different diameters on said head arranged in different horizontal planes and a series of more than two tubular cutting members adapted to be removably mounted on said stepped shoulders, said cutting members having annular cutting edges projecting below said head, said cutting members being of relatively different lengths so that when any two of them are mounted on their respective shoulders their cutting edges will all be in the same horizontal plane.

4. A tool for cutting washers, including a head having formed on the exterior thereof more than two stepped shoulders of relatively different diameters arranged in different horizontal planes and more than two tubular cutting members of relatively different diameters adapted to be removably fitted over said stepped shoulders, said cutting members having annular cutting edges projecting below said head, said cutting members being of relatively different lengths so that when any two of them are mounted on their respective shoulders their cutting edges will all be in the same horizontal plane.

5. A tool for cutting washers including a head having formed therein a bore having internal stepped shoulders of relatively different diameters arranged in different horizontal planes and tubular cutting members of relatively different diameters adapted to be removably fitted into said stepped shoulders, said cutting members having annular cutting edges projecting below said head.

6. A tool for cutting washers, including a head having formed on the exterior thereof stepped shoulders of relatively different diameters arranged in different horizontal planes and a series of more than two tubular cutting members of more than two relatively different diameters adapted to be removably fitted over said stepped shoulders, said cutting members having annular cutting edges projecting below said head, said cutting members being of relatively different lengths according to the different positions of their respective stepped shoulders whereby the cutting edges of different cutting members when mounted on their respective shoulders will all lie in the same horizontal plane.

7. A tool for cutting washers including a head having formed therein a bore having internal stepped shoulders of relatively different diameters arranged in different horizontal planes and tubular cutting members of relatively different diameters adapted to be removably fitted into said stepped shoulders, said cutting members having annular cutting edges projecting below said head, said cutting members being of relatively different lengths according to the different positions of their respective stepped shoulders whereby the cutting edges of different cutting members when mounted on their respective shoulders will all lie in the same horizontal plane.

8. A tool for cutting washers, including a head having formed on the exterior thereof stepped shoulders of relatively different diameters arranged in different horizontal planes, said head having a bore having internal stepped shoulders of relatively different diameters arranged in different horizontal planes and of different diameters to said exterior shoulders, and tubular cutting members of relatively different diameters, some being adapted to be fitted onto said exterior shoulders and some being adapted to be fitted into said interior shoulders, said cutting members having annular cutting edges projecting below said head.

9. A tool for cutting washers, including a head having formed on the exterior thereof stepped shoulders of relatively different diameters arranged in different horizontal planes, said head having a bore having internal stepped shoulders of relatively different diameters arranged in different horizontal planes and of different diameters to said exterior shoulders, and tubular cutting members of relatively different diameters, some being adapted to be fitted onto said exterior shoulders and some being adapted to be fitted into said interior shoulders, said cutting members having annular cutting edges projecting below said head, said cutting members being of different lengths according to the different positions of the different shoulders, whereby when the cutting members are mounted upon or in their respective shoulders their cutting edges will all lie in the same horizontal plane.

10. A tool for cutting washers, including a head having formed on the exterior thereof stepped shoulders of relatively different diameters arranged in different horizontal planes, said head having a bore having internal stepped shoulders of relatively different diameters arranged in different horizontal planes and of different diameters to said exterior shoulders, and tubular cutting members of relatively different diameters, some being adapted to be fitted onto said exterior shoulders and some being adapted to be fitted into said interior shoulders, said cutting members having annular cutting edges projecting below said head, one of said cutters having a reduced upper end, the reduced portion thereof adapted to fit into the lowermost interior stepped shoulder and a shoulder on said cutter abutting the lower end of the said head.

11. A tool for cutting washers, including a head having stepped shoulders of relatively different diameters arranged in different horizontal planes, a set of tubular cutting members of relatively different diameters adapted to be removably fitted to said stepped shoulders, said cutting members having annular cutting edges projecting below said head, and other cutting members of the same diameters as cutting members of said set and adapted to be fitted to the same shoulders, said set of cutters having their cutting edges ground with an inside or outside bevel and said second mentioned cutters being ground with an inside and outside bevel whereby the cutting edges of said last mentioned cutters will make circular cuts of slightly different diameters to said first set of cutters.

ALPHONSE RAPP.